C. SCHMIDT.
SHAFT COUPLING.
APPLICATION FILED MAR. 27, 1907.

930,495.

Patented Aug. 10, 1909.

Witnesses
E. B. Gilchrist
H. R. Sullivan

Inventor
Charles Schmidt
By Thurston Woodward
attorney

UNITED STATES PATENT OFFICE.

CHARLES SCHMIDT, OF CLEVELAND, OHIO, ASSIGNOR TO THE PEERLESS MOTOR CAR COMPANY, OF CLEVELAND, OHIO, A CORPORATION OF WEST VIRGINIA.

SHAFT-COUPLING.

No. 930,495.  Specification of Letters Patent.  Patented Aug. 10, 1909.

Application filed March 27, 1907. Serial No. 364,755.

*To all whom it may concern:*

Be it known that I, CHARLES SCHMIDT, a citizen of the Republic of France, residing at Cleveland, in the county of Cuyahoga and State of Ohio, have invented a certain new and useful Improvement in Shaft-Couplings, of which the following is a full, clear, and exact description.

The object of the invention is to couple a driving and a driven shaft so that motion may be transmitted from the former to the latter and so that said shafts may be turned short distances relatively to each other, either when said shafts are idle or when they are in rotation. One practical use for a shaft coupling of this kind is in connection with the commutator mechanism used as a part of the ignition system of an explosion engine; but there is no intention of having claims of this patent limited to this particular use, because there are uses for which it is equally well adapted.

Figure 1:
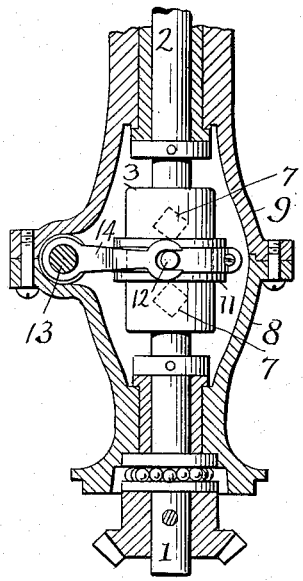
Figure 2:
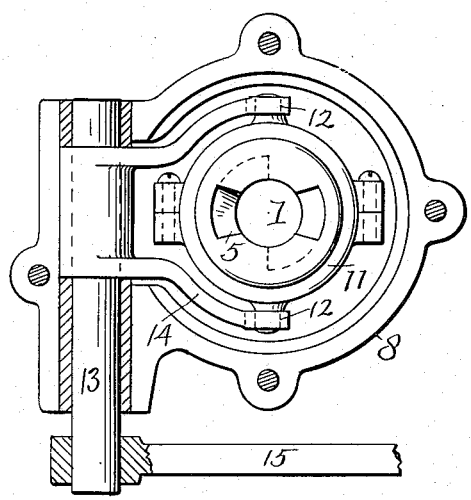
Figure 3:
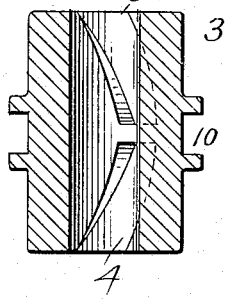
Figure 4:
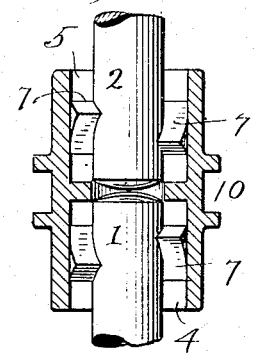
Figure 5:
Figures 6, 7:
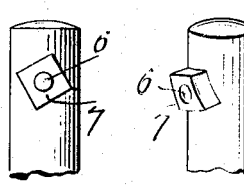

In the drawing, Figure 1 is an elevation of two shafts and a coupling embodying my invention,—the bearings for said shafts being in longitudinal central section. Fig. 2 is an end view of one of said shafts and the coupling and of one part of the casing which furnishes the bearing for said shafts,—the bearing for the shaft which operates the coupling device being shown in section. Fig. 3 is a longitudinal central section of the coupling sleeve. Fig. 4 is a longitudinal central section of said sleeve when embracing the shafts which are designed to couple together. Fig. 5 is an end view of one shaft. Fig. 6 is a side elevation of one of said shafts. Fig. 7 is a perspective view thereof.

Referring to the parts by numerals, 1 and 2 represent two alined shaft sections,—the former being the driving shaft section and the latter the driven shaft section. These shaft sections are mounted in bearings which may be of any suitable form. In the form of the invention which is illustrated in Fig. 1 a coupling sleeve 3 embraces the approximate ends of the two shafts 1 and 2. Within this sleeve and at opposite ends thereof are the differently inclined grooves 4 and 5. These grooves, as shown, are oppositely inclined spiral grooves, and this is believed to be the best construction, because thereby a given longitudinal movement of the sleeve will produce the greatest relative rotation of the two shafts. Each shaft member has within said sleeve the lateral projecting pins 6 which enter adjacent grooves; and preferably blocks 7 are loosely placed upon these pins, which blocks slidingly fit in said grooves. This sleeve has an external annular groove 10, in which a collar 11 is rotatably fitted,—this collar being provided with oppositely extended pins 12. A rock shaft 13 is mounted in suitable bearings and is provided with a forked arm 14, whose ends embrace the pins 12. An operating lever 15 is attached to this rock shaft and furnishes means for rocking it, whereby, through mechanism described, the sleeve 3 is moved endwise. It will, of course, be understood that the shaft sections 1 and 2 are incapable of endwise movement. When, therefore, the sleeve 3 is moved endwise in one direction or the other, the result will be the turning of the shaft sections relatively to one another in one direction or the other, depending upon the direction in which sleeve 3 is moved. The conditions existing at the time the sleeve 3 is moved will determine whether both shafts will be turned in opposite directions, or one shaft alone will be turned or whether, as when both are rotating, the rotation of one will be momentarily accelerated or retarded until the desired relation is attained.

The sleeve 3 not only serves as the means for altering the relative angular position of the shafts, but it also serves as a coupling connecting the two sections, and compels them to rotate in unison when the sleeve is held against endwise movement. It is clear that the coupling sleeve 3 may be moved endwise whether the shafts 1 or 2 are rotating or whether they are idle, and that, therefore, the shaft sections may be turned relative to each other while both are in rotation. As shown the bearings for the two shafts are parts of a casing which incloses the coupling mechanism, said casing being made of two separable parts 8 and 9. But this construction is not essential to the invention.

Having described my invention, I claim:

1. In a shaft coupling, the combination of two alined shafts, a rotatable and endwise movable coupling sleeve embracing their adjacent ends and having differently inclined internal grooves, pins on said shafts projecting into said grooves respectively, blocks loosely embracing said pins and slidably fitted to said grooves, and means for moving the coupling sleeve endwise.

2. In a shaft coupling, the combination of a casing made of two separable sections and containing a coupling chamber, two alined shafts mounted in said casing sections respectively and projecting into said chamber, a rotatably and longitudinally movable coupling sleeve in said chamber embracing the ends of said shafts and having two differently inclined internal grooves, pins secured to the shafts within said casing and projecting into said grooves respectively, a collar rotatably mounted upon the sleeve, there being means on the sleeve for preventing endwise movement of the collar relative to the sleeve, a rock-shaft mounted in the casing, and operative connections between said rock-shaft and collar.

3. In a shaft coupling, the combination of a casing made of two connected sections which are separable in a plane transverse to the axis of the shafts mounted therein, said sections being enlarged at their adjacent ends to form a coupling chamber, two alined shafts mounted in said casing sections respectively and projecting into said chamber, a rotatably and longitudinally movable coupling sleeve in said chamber embracing the ends of said shafts and having two differently inclined internal grooves, pins secured to the shafts within said casing and projecting into said grooves respectively, a collar rotatably mounted upon the sleeve, there being means on the sleeve for preventing endwise movement of the collar relative to the sleeve, a rock-shaft mounted in the casing, a forked lever secured to said rock-shaft and engaging said collar, and an operating lever secured to said rock-shaft outside of the casing.

In testimony whereof, I hereunto affix my signature in the presence of two witnesses.

CHARLES SCHMIDT.

Witnesses:
E. B. GILCHRIST,
H. R. SULLIVAN.